United States Patent

Vogt

Patent Number: 5,249,766
Date of Patent: * Oct. 5, 1993

[54] TRIPOD HEAD

[76] Inventor: Philippe Vogt, Frohalpstrasse 65, 8038 Zurich, Switzerland

[*] Notice: The portion of the term of this patent subsequent to Dec. 17, 2008 has been disclaimed.

[21] Appl. No.: 808,576

[22] Filed: Dec. 17, 1991

Related U.S. Application Data

[62] Division of Ser. No. 376,116, Jul. 6, 1989, Pat. No. 5,072,907.

[30] Foreign Application Priority Data

Jul. 6, 1988 [CH] Switzerland .......................... 2565/88

[51] Int. Cl.⁵ ............................................ F16M 11/00
[52] U.S. Cl. .................. 248/181; 248/288.5; 403/90; 403/125
[58] Field of Search ................ 248/181, 288.3, 288.5; 403/90, 114, 123, 125

[56] References Cited

U.S. PATENT DOCUMENTS

| | | | |
|---|---|---|---|
| 1,797,893 | 3/1931 | Zerk | 248/181 |
| 2,700,523 | 1/1955 | Pollard | 248/181 |
| 3,211,405 | 10/1965 | Fey et al. | 248/181 X |
| 5,072,907 | 12/1991 | Vogt | 248/181 |

FOREIGN PATENT DOCUMENTS

| | | | |
|---|---|---|---|
| 480852 | 2/1952 | Canada | 403/125 |
| 2203196 | 8/1973 | Fed. Rep. of Germany . | |
| 2307826 | 8/1974 | Fed. Rep. of Germany | 248/181 |
| 1112908 | 10/1954 | France . | |
| 2346594 | 10/1977 | France | 403/90 |
| 2606472 | 11/1986 | France . | |
| 22961 | of 1905 | United Kingdom | 248/181 |

Primary Examiner—David L. Talbott
Attorney, Agent, or Firm—Ostrolenk, Faber, Gerb & Soffen

[57] ABSTRACT

The tripod head contains a cylindrical housing (1), a connecting device (2) which closes the housing (1) off on one side, at least one body (3, 4) which is movably arranged in the housing (1) and at least one fastening device (6, 7) having at least two members (17, 18), each of which is provided with an oblique surface. The members are arranged resting on a base (2, 26) with the oblique surfaces resting on each other and displaceable transverse to each other in order to displace the one member (16, 25) against the body (3, 4) so as to obtain the clamping action. A setting device (19, 28) is provided by which the members (17, 18; 26, 27) are displaceable transverse to each other.

16 Claims, 3 Drawing Sheets

TRIPOD HEAD

This is a division of application Ser. No. 07/376,116, filed Jul. 6, 1989 now U.S. Pat. No. 5,072,907.

BACKGROUND OF THE INVENTION

The present invention relates to a tripod head for receiving an optical instrument, having a cylindrical housing which has a connecting device for a tripod on one end, having a body of two-dimensional symmetry which is movably arranged in the housing and is provided with a locking device for clamping the body fast.

In a conventional tripod head of this type, the body is a ball having an extension for the connecting of the optical instrument, and the locking device consists essentially of a slit annular clamping part having a recess adapted to the spherical contour and within which a spherical section lies, and a clamping screw for pressing the clamping part against the ball in order to clamp the ball fast with respect to the housing.

The disadvantages of this tripod head are essentially that, particularly in the case of large-size cameras, the required clamping action cannot be applied to the ball in the case where the tripod head is supporting an inclined plate holder or lens holder, the housing is deformed in the region of the clamping screw, and the optical instrument cannot be mounted in such a manner as to be free of vibration.

SUMMARY OF THE INVENTION

The object of the invention is to provide a tripod head in which these disadvantages are not present and in which any swinging motion of the tripod head is subjected to increased damping as the angle of swing increases and in which the position of the tripod head can be fixed precisely.

This object is achieved by a tripod head which is formed of a housing and a rotatable rotation-symmetrical joint body which can be secured stationary in the housing and has the form of an oblate spheroid or ellipsoid. The joint body may be secured by a clamping mechanism for applying a clamping force to the joint body to secure the joint body in position. The clamping mechanism may include a clamping surface which is displaceable toward the joint body in a first direction, sloping surfaces which are in slidable contact with each other, and a setting device for displacing one of the sloping surfaces in a second direction, which is transverse to the first direction, to thereby displace the clamping surface toward the joint body to obtain the clamping force.

The advantages which can be obtained by the invention reside essentially in the fact that due to the clamping force which acts in a direction toward the joint body a dependable clamping action is obtained, and any swinging movements of the optical instrument that occur are effectively damped.

In a preferred embodiment of the invention, a first and second body of two-dimensional symmetry are provided, the first and second bodies being arranged at a right angle to each other and being swingable transverse to the axis of the housing, at least one body having a connecting section for the optical instrument and a second locking device being associated with the second body.

The advantages which can be obtained thereby reside in the fact that by separate, clearly defined swinging movements the optical instrument is easier to adjust and is held, free of vibration, by the locking means.

In a further embodiment, the body has two identically developed sections which are formed along a line, two housings are provided, one of which is arranged one on each section, and being swingable around axes arranged at right angles to each other, and a locking device in associated with each section.

This embodiment has the advantage that it is of simple construction and is particularly suitable for the swing-free mounting of optical instruments of light weight.

BRIEF DESCRIPTION OF THE DRAWINGS

The invention will be described in further detail below with reference to the accompanying drawings, in which.

DETAILED DESCRIPTION OF THE PREFERRED EMBODIMENTS

Figure 1:
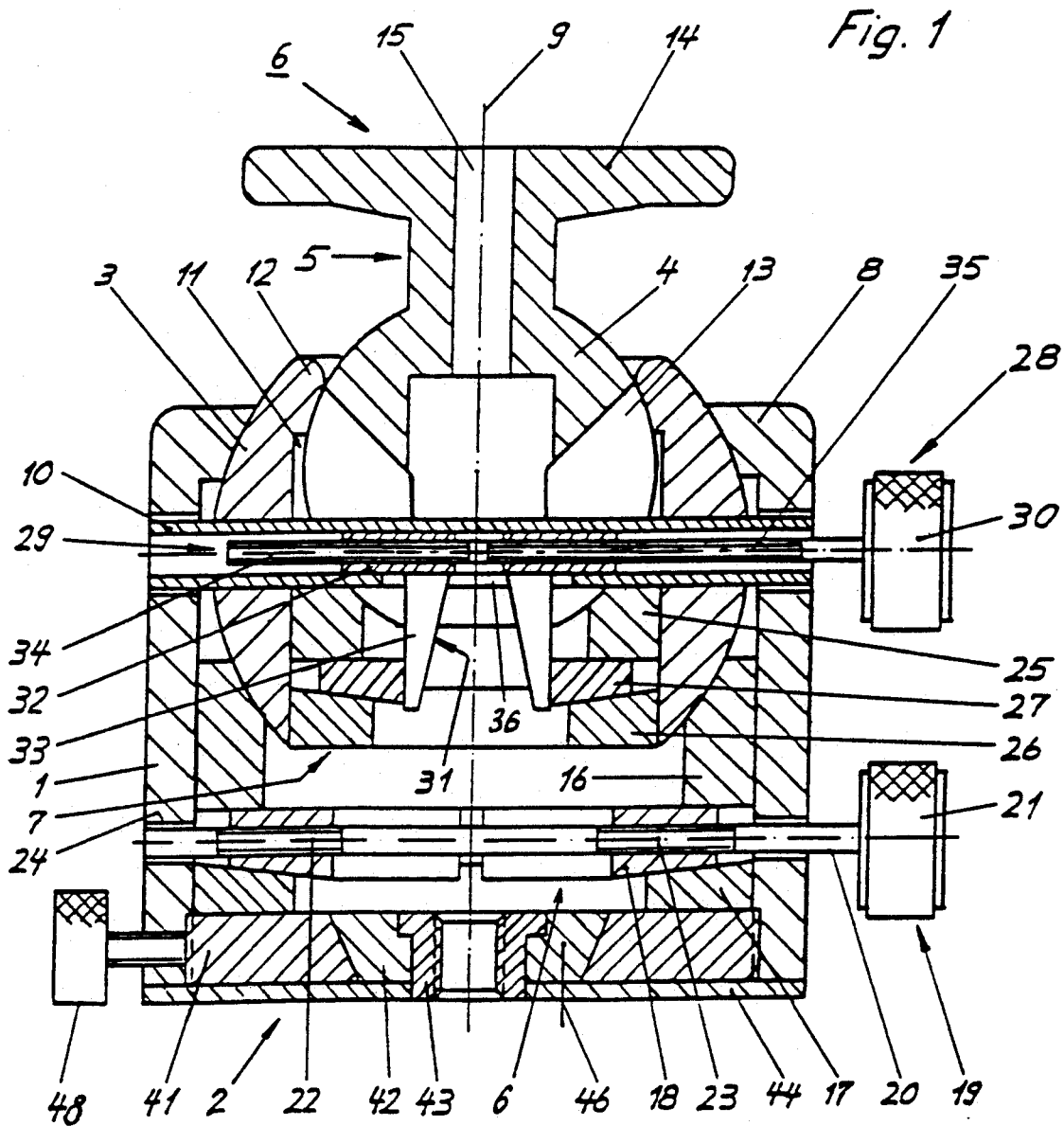
FIG. 1 is a section through a preferred embodiment of a tripod head according to the invention.

The tripod head of FIG. 1 contains a cylindrical housing 1 having a connecting device 2 for a tripod, which device is mounted on one end of the housing, which will be referred to as the lower end. The tripod head also has a first body 3 and a second body 4 with a connecting section 5 for an optical instrument, said bodies being swingably mounted in the housing, and having first and second locking devices 6, 7 which are associated with the first and second bodies 3, 4, respectively.

At the other end of the housing, which will be referred to as the upper end, a mounting section 8 for the first body 3 is formed. The first body 3 is mounted for swinging around a hollow shaft 10 which is arranged transverse to the axis 9 of the housing. A cylindrical recess 11 and a mounting section 12 for the second body 4 are developed within the first body 3. The second body 4 is provided with a slit 13 and is so arranged in the first body 3 that it is swingable transverse to the hollow shaft 10 and is guided along the hollow shaft 10. A camera plate 14 is arranged on the free end of the connecting section 5. There is also present in the connecting section a bore hole 15 for a threaded bolt (not shown), for the fastening of the optical instrument. The first and second bodies 3, 4 have rotational symmetry and are so arranged in position of rest that their axes of rotation coincide.

The locking device 6 for the first body 3 has an annular clamping part 16, the outer wall of which is guided on the inside of the housing 1, as well as a support ring 17 one face of which rests on the connecting device 2 and the outer face of which is provided with a radially outward ascending oblique surface, two sliding parts 18 which, on the one hand, rest against the clamping part 16 and, on the other hand, are provided with an oblique surface, as well as a setting device 19 which is in engagement with the sliding parts 18. The oblique surfaces on the support ring 17 and on the sliding parts 18 have opposite inclinations of the same angle of inclination. The support ring 17 and the sliding parts 18 have their oblique surfaces resting against each other so that radial displacement of the sliding parts 18 results in a displacement of the clamping part 16 upward in the direction towards the first body 3. This radial displacement of the sliding parts 18 is effected by the setting device 19 which consists of a spindle 20 and a turn knob 21. For this purpose, a threaded hole is provided in each of the sliding parts 18 and threaded sections with left-hand or right-hand thread 22, 23 are developed on the spindle 20, the sliding parts 18 being screwed on said threads. The spindle 20 extends on one side out of the housing 1 and is provided on that end with a turn knob 21. The spindle 20 is guided in a slot 24 the center line of which extends parallel to the axis 9 of the housing so as to permit the displacement of the spindle 20 upon the locking of the first body 3.

The locking device 7 for the second body 4 is developed in a manner similar to the locking device 6 for the first body 3 but it differs in the development of the setting device. This locking device contains an annular clamping part 25 the outer surface of which is guided on the inside of the recess 11, as well as a support ring 26 which is provided on one face with an oblique surface and is fastened on its circumference in the recess 11 of the first body 3 so that the oblique surface lies within the recess and ascends radially outward; furthermore, two sliding parts 27 which rest on the one side against the clamping part 25 and on the other side are provided with an oblique surface, and a setting device 28 which is in engagement with the sliding parts 27. The arrangement of the clamping part 25, support ring 26 and sliding parts 27 with respect to each other is the same as in the case of the locking device 6 for the first body 3, so that their description can be dispensed with.

The setting device 28 contains a spindle 29 which extends on the one side out of the housing 1, a turn knob 30 which is fastened on the spindle, and two sliding elements 31 which are connected with the sliding parts 27. The sliding elements 31 each have a threaded sleeve 32 with internal thread and an arm 33 which protrudes radially from the threaded sleeve. One threaded sleeve 32 is provided with a right-hand thread and the other with a left-hand internal thread. The spindle 28 is provided with a right-hand thread section 34 and a left-hand thread section 35 onto which sections the sliding elements 31 are screwed, their threaded sleeves 32 being guided on their circumference in the hollow shaft 10. The hollow shaft 10 is furthermore provided with a slit 36 through which the arms 33 extend and which prevents twisting of the sliding elements 31 upon the turning of the spindle 29. In this way, the sliding elements 31 are moved toward and away from each other when the spindle is turned.

Figure 4:
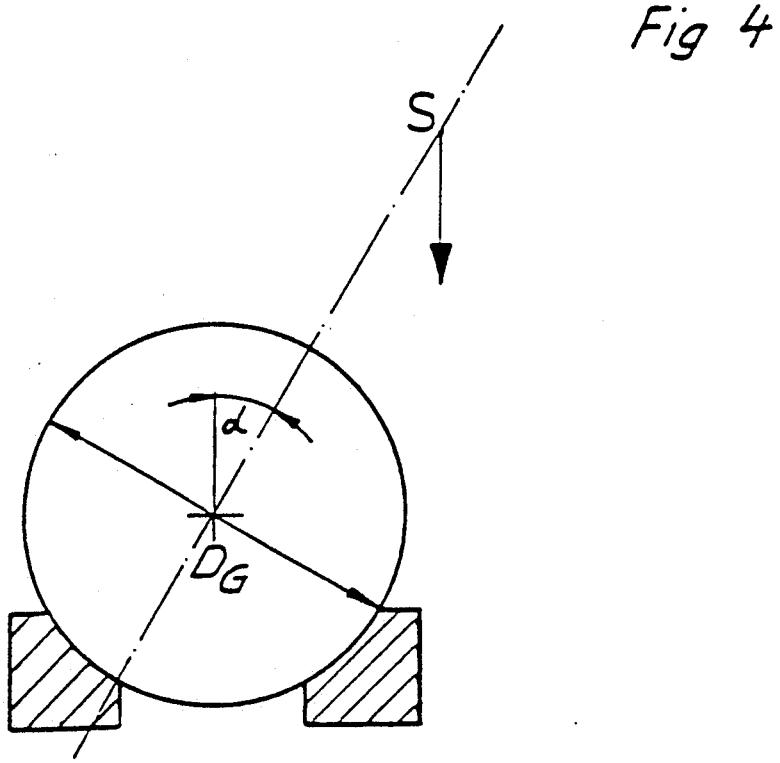
FIG. 4 diagrammatically illustrates the pivoting of a joint body.

The bodies, which are developed as bodies of revolution, represent a flattened or oblate ellipsoid of rotation, i.e. they have approximately the shape of the terrestrial globe which in the region of the equator line has a diameter $D_G$ (FIG. 4). As shown in FIG. 1, the clamping part 16 has a recess which is adapted to the flatter section of the first body 3. The first body 3 is so arranged in a basic position in the housing 1 that its axis of rotation coincides with the axis 9 of the housing and is swingable around the hollow shaft 10 which intersects the equator line. By the development and arrangement of the first body 3, the result is obtained that, with increasing angle of swing and as a result of the increasing circumference of the first body 3 resting against the clamping 16, the clamping action is increased. In this way, on the one hand, the swinging movement is dampened and, on the other hand, the occurrence of undesired swinging motion in the case of a heavy optical instrument is prevented.

The second body 4 is also a body of revolution and has the same oblate contour, except for the connecting section 5. This second body 4 is so arranged in a basic position in the first body 3 that its axis of rotation coincides with the axis 9 of the housing. The manner of operation of the second body 4 is similar to that of the first body 3 and will therefore not be described. The first and second bodies 3, 4 can be provided with a coating (not shown) on the regions of their surface which are in contact with the mounting sections 8 and 12. However, it is also possible to use a mounting ring (not shown) of suitable material.

The connecting device 2 for the tripod (not shown) contains a slit ring 41 having a conical bore in its center and an external thread on its circumference. Within the housing 1 there is developed an internally threaded section into which the ring 41 is screwed. The connecting device 2 furthermore contains a frustoconical insert 42 the inclination of which is adapted to the conical bore and which has a threaded sleeve 43 with internal thread in the center as well as a cover 44 which is fastened to the insert 42 by countersunk screws 46. The connecting device 2 is screwed with the ring 41 into the housing 1, the insert 42 and the cover 44 being turnable on the ring 41 and thus serving for panoramic swinging.

For the locking of the panoramic swinging there is a provided a set screw 48 which is screwed into a threaded hole which is provided in housing 1 in the region of the ring 41. By means of this set screw 48 the ring 41 can be pressed against the insert 42.

Figure 2:
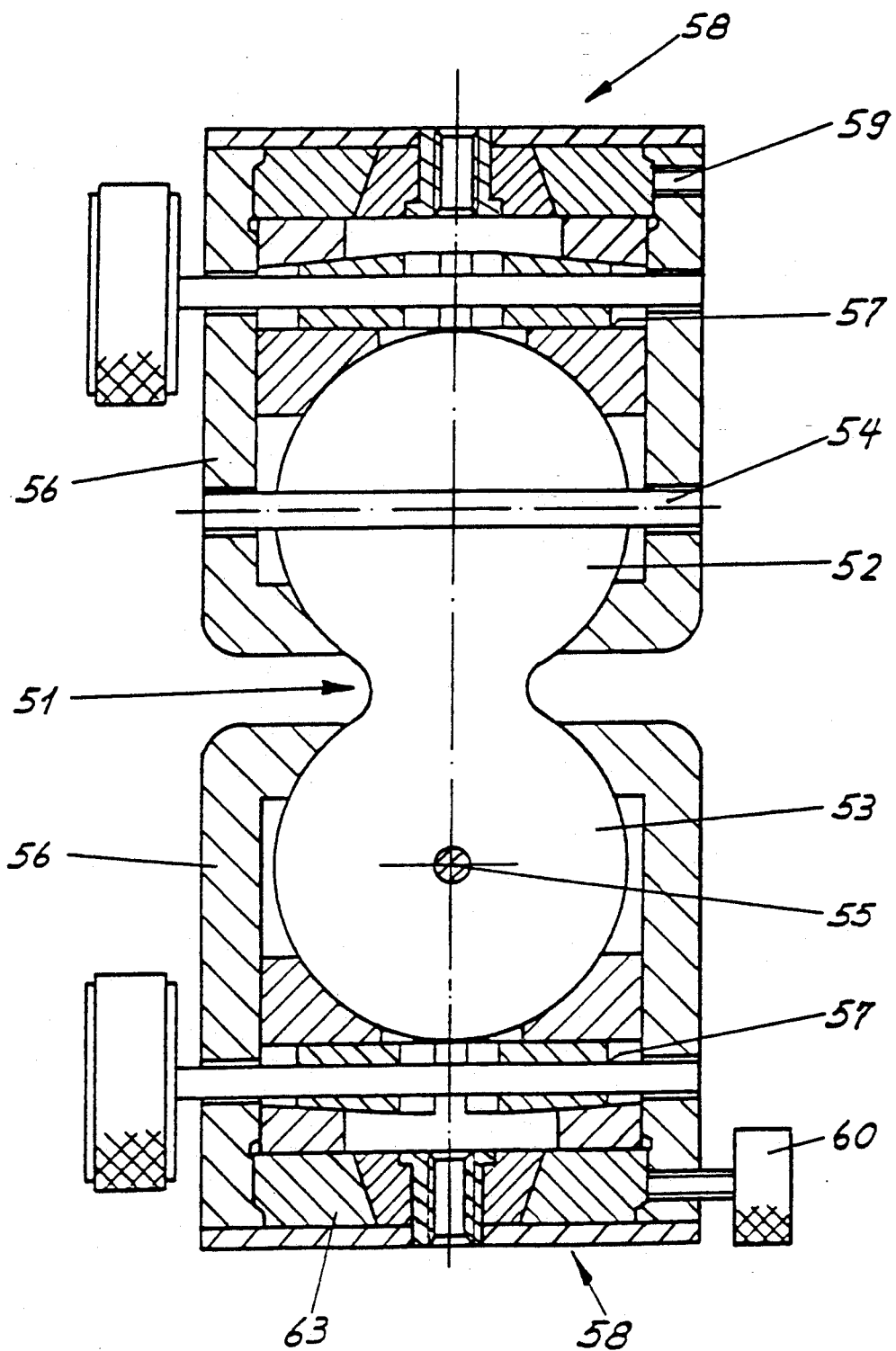
FIG. 2 is a section through another embodiment of the tripod head of the invention.

The embodiment shown in FIG. 2 contains a body 51 which is a body of revolution. The body 51 has two sections 52 and 53 which represent a flattened or oblate ellipsoid of rotation, i.e. it has approximately the shape of the terrestrial globe with the largest diameter in the region of the equator line. In each section 52, 53 a shaft 54 and 55 respectively is fastened, the shafts being arranged at right angles to each other and transverse to the axis of rotation. The shafts protrude on both sides from the sections 52 and 54. Each section has associated with it a housing 56 and a locking device 57 the development of which is similar to that described in connection with FIG. 1. Each housing 56 has a connecting device 58 which is the same as the one described in connection with FIG. 1.

In the embodiment of FIG. 2, one connecting device 58 is secured against turning by a threaded pin 59 and is used for the connecting of the optical instrument while the other connecting device 58 is connected to the tripod and serves for the panoramic swinging. For this purpose, a clamping screw 60 is provided in accordance with the invention. In order to obtain the clamping action, the ring 63 is slit so that the ring 63 can be pressed together by the clamping screw 60. In the case of the connecting device 58 for the optical instrument, the clamping is effected by the threaded pin 59.

The sections 52 and 53 of the body 3 are provided with cylindrical recesses in order to reduce the weight of the body.

Instead of the one-piece body, two bodies developed in accordance with sections 52 and 53 can be provided, the two bodies being connected for rotation with each other and being separated by a spacer member.

Figure 3:
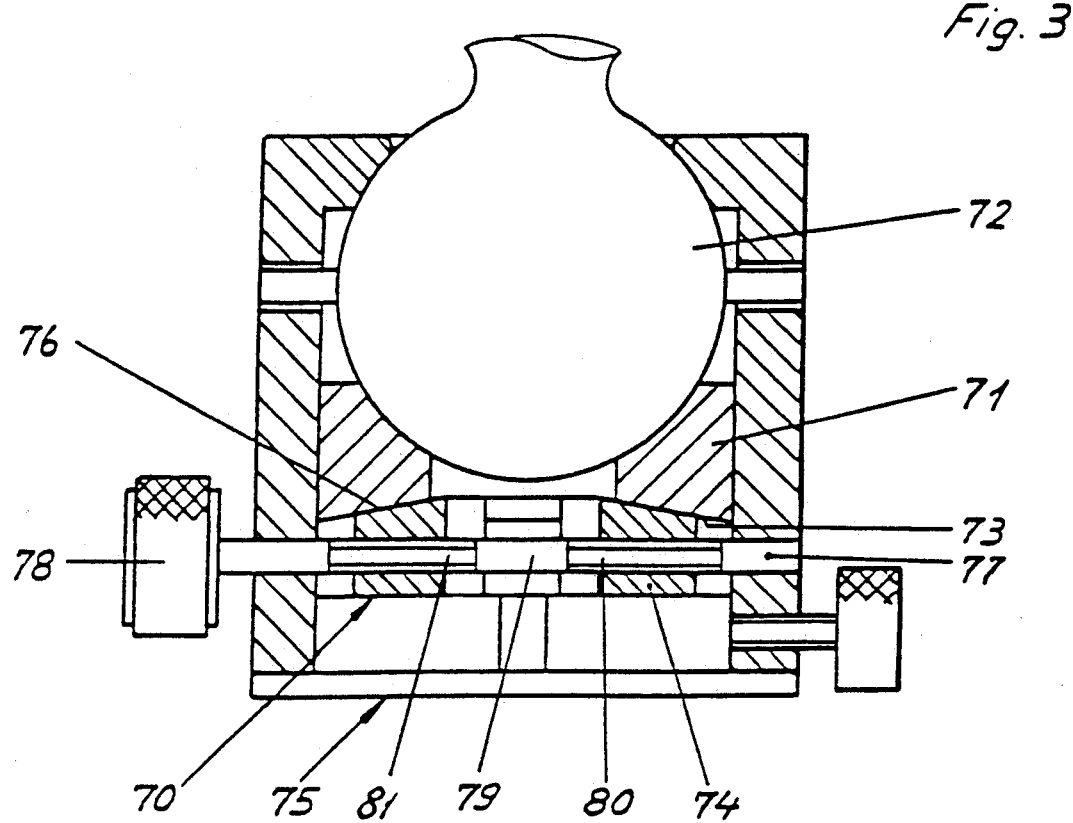
FIG. 3 shows a modified embodiment of the locking device.

As shown in FIG. 3, the locking device 70 can be modified in the manner that the annular clamping part 71 has a recess which is adapted to the body 72 on its one face and an oblique surface 73 on its other face, and the sliding part 74 has the oblique surface 76 on the side facing away from the side which lies on the connecting device 75. In this case, the clamping part 71 is shifted in the direction toward the body 72 by the displacement of the sliding parts 74, the clamping action being thereby obtained. This displacement of the sliding parts 74 is effected by a setting device 77 having a spindle 79 and a turn knob 78. The spindle 79 has a right-hand thread section 80 and a left-hand threaded section 81, similar to the locking device for the first body in FIG. 1.

The effect of the shape of the body will be explained with reference to FIG. 4. As already mentioned, the body has the shape of a terrestrial globe which has its largest diameter $D_G$ in the region of the equator line. If a body or a housing is swung by the angle, a part of the widened section of the body in the recess in the clamping part will effect a greater clamping action in this region. In this way, a greater damping is obtained, so that the center of gravity of the apparatus or instrument fastened on the body can, due to swinging, lie outside the circumference of the sphere.

I claim:

1. A tripod head for supporting an optical instrument, comprising:
   a housing means;
   an oblate joint body located within the housing means, the joint body having a major axis, and being rotatable within the housing means around an axis which is transverse to the major axis; and
   clamping means in the housing means for applying a clamping force to the joint body to secure the joint body in position.

2. A tripod head according to claim 1, further comprising a second oblate joint body and second clamping means in the housing means for applying a clamping force to the second joint body.

3. A tripod head according to claim 2, wherein the second joint body is located within the first joint body.

4. A tripod head according to claim 3, wherein the second clamping means is located within the first joint body.

5. A tripod head according to claim 2, wherein the housing means has a first end, a second end, an opening at the first end, and a connecting device at the second end for connection to a tripod;
   the second joint body extending out of the first end of the housing means and including means for being connected to and supporting the optical instrument.

6. A tripod head according to claim 1, wherein the clamping means includes a clamping surface which is displaceable toward the joint body in a first direction, sloping surfaces which are in slidable contact with each other, and a setting device for displacing one of the sloping surfaces in a direction which is transverse to the first direction, to thereby displace the clamping surface toward the joint body to obtain the clamping force.

7. A tripod head according to claim 2, wherein the second clamping means includes a clamping surface which is displaceable toward the second joint body in a first direction, sloping surfaces which are in slidable contact with each other, and a setting device for displacing one of the sloping surfaces in a direction which is transverse to the first direction, to thereby displace the clamping surface toward the second joint body to obtain the clamping force.

8. A tripod head according to claim 7, wherein the second joint body and the second clamping means are located within the first joint body.

9. A tripod head according to claim 7, wherein the second clamping means includes opposed sliding parts and a second setting device which includes a hollow shaft, a spindle, and sliding elements, the spindle including oppositely threaded sections, an end, and a rotatable turn knob, the turn knob being located at the end of the spindle, each of the sliding elements including an internally threaded sleeve and an arm which extends radially from the sleeve and which engages a respective one of the sliding parts, the second clamping mechanism being arranged such that when the turn knob is rotated, the second clamping force is applied to the second joint body by displacing the sliding elements and with them the sliding parts in opposite directions.

10. A tripod head according to claim 6, wherein the housing means is cylindrical, the clamping mechanism including an annular clamping component which slides within the housing means and which comprises the clamping surface, opposed sliding parts which comprise one of the sloping surfaces, and a stationary support ring which comprises another of the sloping surfaces, the sliding parts being located between the clamping component and the stationary support ring, the setting device being operatively engaged with the sliding parts to displace the clamping surface of the clamping component toward the joint body.

11. A tripod head according to claim 6, wherein the clamping surface is curved and shaped to match the surface of the oblate ellipsoidal joint body, whereby the clamping force increases or decreases as the joint body is rotated.

12. A tripod head according to claim 6, wherein the clamping mechanism includes opposed wedge-shaped sliding parts, the parts comprising one of the sloping surfaces.

13. A tripod head according to claim 6, wherein the housing means is cylindrical, the clamping mechanism including an annular clamping part which slides within the housing means and which comprises the clamping surface and one of the sloping surfaces, and opposed sliding parts one of which has a right-hand thread section and the other of which has a left-hand thread section, the sliding parts comprising another of the sloping surfaces, the setting device including a threaded spindle and a turn knob, the spindle being engaged with the thread sections so as to move the sliding parts in opposite directions to thereby move the clamping surface toward the joint body.

14. A tripod head according to claim 1 the housing means comprising a first housing and a second housing, further comprising a second clamping mechanism for applying a clamping force to the joint body, the joint body having first and second identical aligned sections which are pivotably located within the first and second housings, respectively, the first and second clamping mechanisms being associated with the first and second sections, respectively.

15. A tripod head according to claim 1, further comprising a second oblate joint body, second housing means, and second clamping means in the second housing means for applying a clamping force to the second joint body.

16. A tripod head according to claim 15, wherein the first housing means has means for connection to a tripod, and the second housing means has means for connection to the optical instrument.

* * * * *